Oct. 19, 1954 — A. E. BRICKMAN — 2,691,900
FLEXIBLE CONDUIT
Filed May 23, 1950 — 3 Sheets-Sheet 1
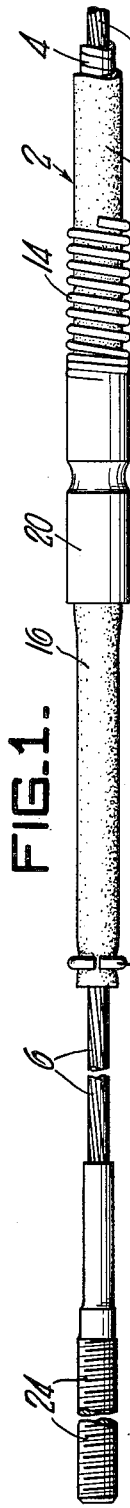
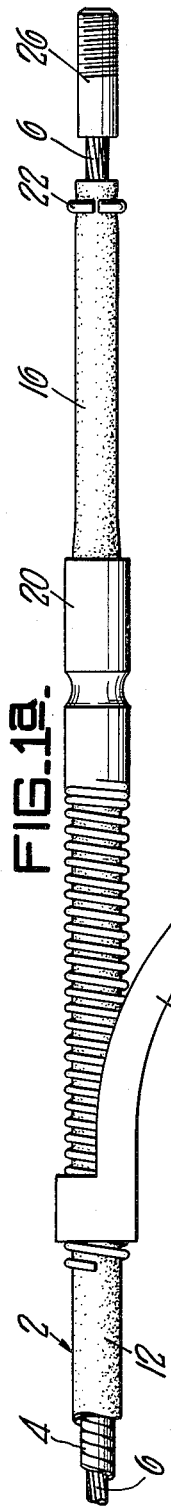
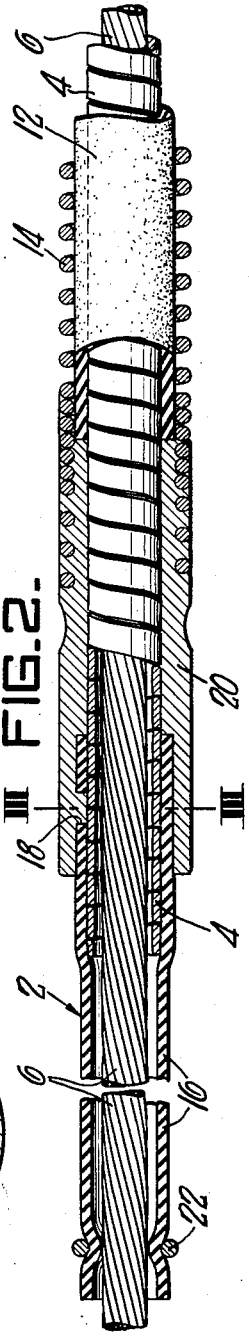
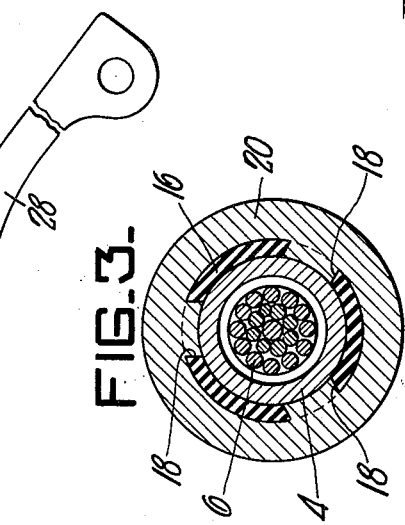
Inventor:
ALAN E. BRICKMAN,
by: Donald G. Dalton
his Attorney.

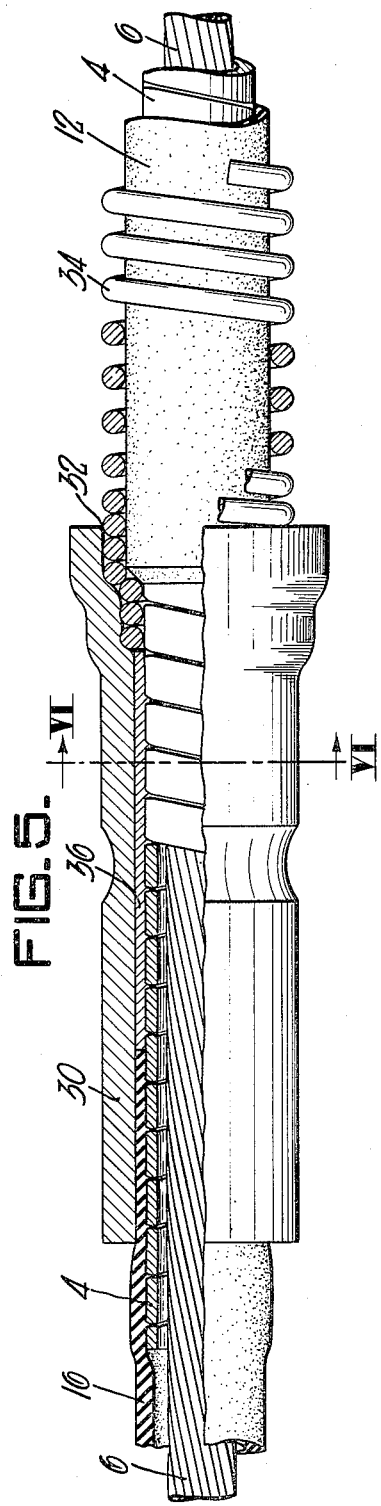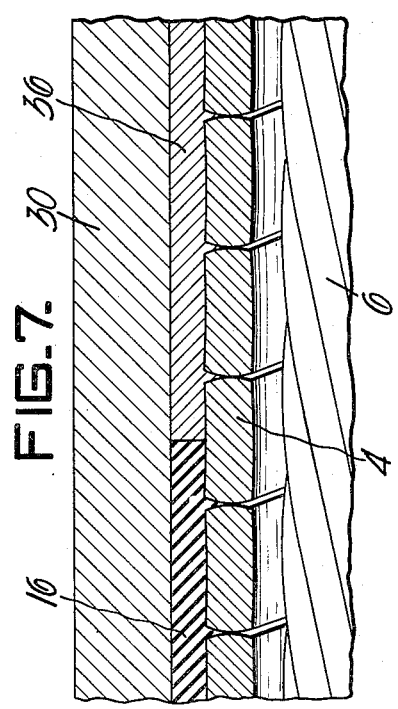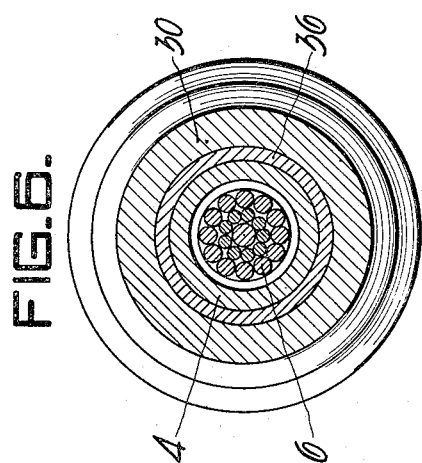

Oct. 19, 1954  A. E. BRICKMAN  2,691,900
FLEXIBLE CONDUIT

Filed May 23, 1950  3 Sheets-Sheet 3

Inventor:
ALAN E. BRICKMAN,
by Donald G. Dalton
his Attorney.

Patented Oct. 19, 1954

2,691,900

UNITED STATES PATENT OFFICE 2,691,900

FLEXIBLE CONDUIT

Alan E. Brickman, Worcester, Mass., assignor to United States Steel Corporation, a corporation of New Jersey Application May 23, 1950, Serial No. 163,631

5 Claims. (Cl. 74—501)

This invention relates to a flexible conduit and particularly to flexible conduits for brake control cables. Various types of conduits have been provided for this purpose. For example, the patents to Brickman No. 2,046,545 and Reissue No. 21,006 disclose similar conduits while the patent to Brickman No. 2,092,830 discloses the use of such conduits with brake control cables. The invention relates in particular to brake control conduits such as those disclosed in my copending patent applications, Serial Nos. 67,489 and 67,490, filed December 27, 1948, now Patent Nos. 2,550,669 and 2,550,670, respectively. In brake control assemblies now in use, separate flexible seals are provided between the end of the conduit and the steel brake cable. These seals fit over the outside of the end fitting on the conduit so that they increase the diameter of the assembly. When the conduit is assembled on the automobile, it is threaded through openings in brackets on the frame, which openings are only slightly larger than the outside diameter of the end fittings on the conduit. Because of this arrangement it is very difficult to apply the flexible seals to the ends of the conduits.

It is therefore an object of my invention to provide a brake cable conduit having a flexible seal at the end thereof, which conduit can be quickly applied to the frame of the vehicle.

Another object is to provide a conduit having a flexible seal integral therewith.

These and other objects will be more apparent after referring to the following specification and attached drawings, in which:

Figures 1 and 1a taken together show a brake cable assembly embodying my invention;

Figure 2 is an enlarged sectional view of the end of the conduit and brake cable showing the flexible seal;

Figure 3 is a sectional view taken on line III—III of Figure 2;

Figure 4 is an enlarged sectional view of a portion of Figure 2;

Figure 5 is a view, partially in section, of a second embodiment of my invention;

Figure 6 is a sectional view taken on line VI—VI of Figure 5;

Figure 7 is an enlarged sectional view of a portion of Figure 6; and

Figure 8:
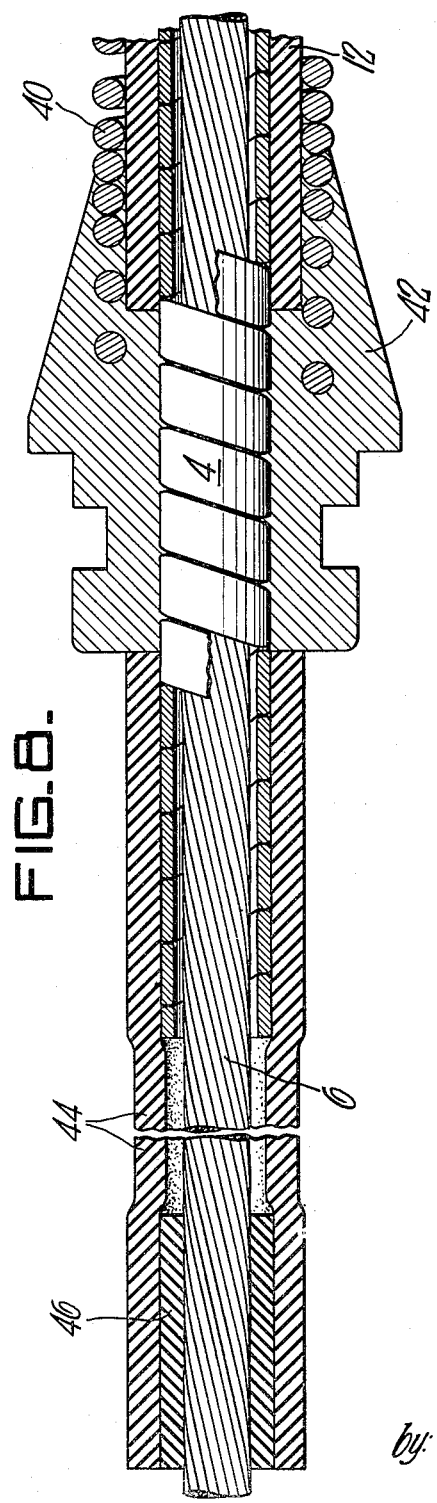
Figure 8 is a view, similar to Figure 5, showing a third embodiment of my invention.

Referring more particularly to Figures 1 and 1a of the drawings, the reference numeral 2 indicates a flexible conduit of my invention. In making the conduit a flat hard rolled wire 4 is spirally wound to provide a hollow core member or tube through which a brake cable 6 passes. When forming the hollow core member, the flat wire 4 is preferably coiled with a lead of between approximately 9 and 16½° to provide an initial tension in the wire. When so coiled, the wire has a tendency to curl up at the edges so that each convolution of flat wire will have a concave outer surface 8 and a convex inner surface 10 as best shown in Figure 4. Also, each convolution is firmly pressed against the adjacent convolution so as to seal the space between them. A jacket 12 of rubber, neoprene, nylon, or other flexible material, is then extruded or strip insulated on the member 4. It will be noted that the outer interstices between the convolutions are larger than the corresponding inner interstices. The jacket 12 will flow into the outer interstices thus increasing the bond between the jacket and member 4. The rubber covering 12 is then stripped from the end of the conduit and a helically wound coil spring 14 is placed over a portion of the rubber covering 12 and also over the bared portion of the conduit as shown in Figure 2. A flexible tubular rubber seal 16 having a normal inside diameter smaller than the outside diameter of the hollow tubular metallic core 4 is expanded and pulled over a substantial portion of the end of the core member. When thus expanded over the core member, a portion of the rubber will be forced into the outer interstices of the tubular metallic core member 4, thereby holding the end portion of the seal 16 on the core member. Radial holes 18 may be provided in the end of the seal 16, if desired, for a purpose which will appear later. A fitting 20 is then die cast over the bared portion of the member 4, over that part of the spring 14 which extends around the bared portion, and over the end of the flexible seal 16 which extends around the bared portion. The metal of the die casting 20 will flow into the outer interstices of the core member 4 and will further compress the rubber of the seal 16 into the outer interstices thereof. The metal flowing into the openings 18 increases the grip between the seal 16 and the fitting 20. The core member 4 may extend beyond the end of the fitting 20 as shown in Figure 2 to prevent the seal 16 from collapsing. A similar fitting 20 is provided at the opposite end of the conduit. The free end of the flexible seal 16 has its outer end tightly secured to the brake cable 6 by means of a clip or band wire 22. The movement of the cable 6 in the conduit is relatively small and as it moves the seal 16 will expand and collapse an amount sufficient to permit such movement with respect to the main portion of the conduit without relative movement between the cable and the clip 22. The cable 6 is provided with a threaded fitting 24 at one end thereof connected to actuating mechanism (not shown) and a fitting 26 at the opposite end thereof connected to the brake. A bracket 28 has one end attached to the vehicle and the other end surrounding the conduit 2 to furnish a support for the same.

In place of the die cast fitting 20, a swaged fitting 30 may be provided as shown in Figures 5 and 7. The fitting 30 may have a bell-mouth 32 at one end to receive a coil spring 34 which is similar to spring 14 except that the inner portion thereof is reduced in diameter, as shown, so that it can be received in the bell-mouth 32. An inner sleeve 36 may be provided having one end abutting the end of the spring 34 and the other end extending over the bared portion of the inner core 4. This inner sleeve primarily functions as a filler member and is preferably made of a soft malleable material. The end of the rubber seal 16 abuts against the sleeve 36. The inner sleeve 36 may be swaged solidly against the core member 4 with the metal flowing into the outer interstices of the core member to provide a better bond therebetween as shown in Figure 7. After the parts are assembled, the fitting 30 is swaged so that it firmly grips the end of the rubber seal 16 and also becomes bonded to the core 4 through the filler sleeve 36 if one is used. If the filler sleeve 36 is omitted, the shape of the outer fitting 30 will be changed so that it will have a portion corresponding to the inner sleeve 36.

In the embodiment of my invention shown in Figure 8, the rubber covering 12 is stripped from the metallic core 4 for some distance adjacent one end. A spring 40, which is similar to spring 14, is then placed over a portion of the rubber covering 12 and also over part of the bared portion of the conduit. A terminal fitting 42 is then die cast over part of the bared portion of member 4, over part of the rubber covering 12 and part of the spring 40 as shown in the drawings. Part of the bare length of the core 4 extends beyond the die cast fitting 42. A flexible tubular rubber seal 44, which is similar to the rubber seal 16, is expanded and pulled over the end of the core member 4 until its end abuts the fitting 42. When thus expanded over the core member, a portion of the rubber will be forced into the outer interstices of the tubular metallic core member 4, thereby holding the end portion of the seal 44 on the core member. Prior to assembling the member 44 on the core 4 a length of tubing 46 having an internal diameter slightly less than the external diameter of cable 6 and an external diameter slightly greater than the internal diameter of tubing 44 is cemented inside tubing 44 at the end thereof remote from fitting 42.

In making up a brake cable assembly the rubber seal 44 is drawn on the cable ahead of the conduit assembly and is then drawn back over the exposed length of the metallic core 4. The movement of the cable 6 is relatively small and the seal 44 will expand and collapse an amount sufficient to permit such movement with respect to the main portion of the conduit without relative movement between the cable and the tube 46. This type of rubber seal 44 may be used with the types of fittings shown in either Figures 2 or 5.

While three embodiments of my invention have been shown and described it will be apparent that other adaptations and modifications may be made without departing from the scope of the following claims.

I claim:

1. An assembly for a cable comprising a flexible conduit through which the cable passes, a fitting integrally secured to one end of the conduit, and a flexible tubular seal integrally secured to said fitting on the end opposite said conduit and extending therefrom, said seal having an outside diameter not exceeding the outside diameter of said fitting whereby the assembly may be threaded through an opening only slightly larger than the outside diameter of said fitting.

2. An assembly for a cable comprising a flexible conduit through which the cable passes, a fitting integrally secured to one end of the conduit, a flexible tubular seal integrally secured to said fitting on the end opposite said conduit and extending therefrom, said seal having an outside diameter not exceeding the outside diameter of said fitting whereby the assembly may be threaded through an opening only slightly larger than the outside diameter of said fitting, and means for adjustably securing the free end of said seal to said cable.

3. A flexible conduit for a cable comprising a spirally wound metallic core, a flexible jacket surrounding said metallic core for a portion of its length, one end of said metallic core being uncovered, a fitting integrally secured to the uncovered end of said core, and a flexible tubular seal integrally secured to said fitting and extending therefrom away from said core, said seal having an outside diameter not exceeding the outside diameter of said fitting whereby the assembly may be threaded through an opening only slightly larger than the outside diameter of said fitting.

4. A flexible conduit for a cable comprising a spirally wound metallic core, a flexible jacket surrounding said metallic core for a portion of its length, one end of said metallic core being uncovered, a flexible seal surrounding the uncovered end of said core and extending therefrom around said cable, a cast fitting surrounding the end of the flexible seal and the end of the metallic core adjacent thereto, said seal having an outside diameter not exceeding the outside diameter of said fitting whereby the assembly may be threaded through an opening only slightly larger than the outside diameter of said fitting, said seal having an inside diameter greater than the outside diameter of the cable, and a clip around said seal adjacent the free end thereof.

5. A flexible conduit for a cable comprising a metallic core formed of metallic strip helically wound with the strip having a concave outer surface and a convex inner surface, the helices having interstices therebetween which are larger on the outside than on the inside of the core, a flexible seal surrounding one end of the metallic core and extending therefrom around said cable, said seal having an inside diameter greater than the outside diameter of the cable, a clip around said seal adjacent the free end thereof, a fitting surrounding and in intimate contact with the end of the flexible seal and the end of the metallic core adjacent thereto, said seal having an outside diameter not exceeding the outside diameter of said fitting whereby the assembly may be threaded through an opening only slightly larger than the outside diameter of said fitting, a flexible jacket surrounding said metallic core adjacent the fitting on the end opposite said seal, and a coil spring surrounding the flexible jacket adjacent said fitting.

References Cited in the file of this patent

UNITED STATES PATENTS

| Number | Name | Date |
|---|---|---|
| 679,343 | Singer | July 30, 1901 |
| 901,339 | Grant | Oct. 20, 1908 |
| 1,639,742 | Mallory | Aug. 23, 1927 |
| 1,821,646 | Jones | Sept. 1, 1931 |
| 1,867,579 | Mandelick | July 19, 1932 |
| 2,083,937 | Begg | June 15, 1937 |
| 2,189,452 | Stone | Feb. 6, 1940 |
| 2,308,669 | Beed | Jan. 19, 1943 |
| 2,492,030 | Beekley | Dec. 20, 1949 |
| 2,530,164 | Harshbarger | Nov. 14, 1950 |
| 2,531,095 | Williams | Nov. 21, 1950 |
| 2,550,669 | Brickman | May 1, 1951 |

FOREIGN PATENTS

| Number | Country | Date |
|---|---|---|
| 4,316 | Great Britain | Feb. 24, 1903 |
| 609,567 | Great Britain | Oct. 4, 1948 |